May 27, 1969      W. J. PETERS      3,446,526
COLLAPSIBLE COVER FOR LUGGAGE COMPARTMENTS IN COMPACT VEHICLES
Filed Nov. 7, 1966
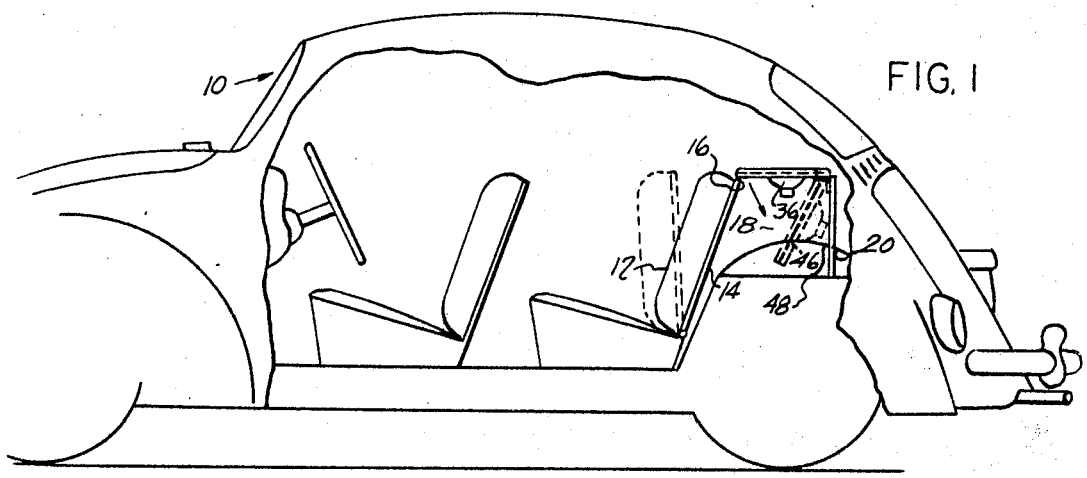
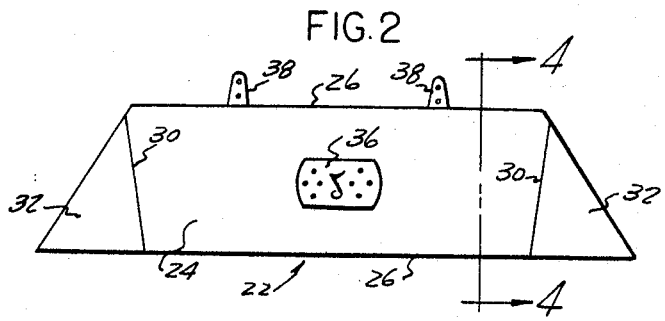
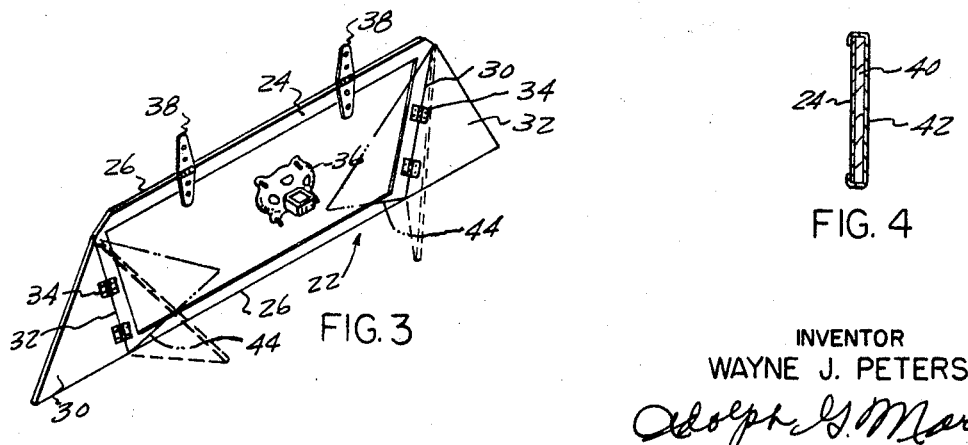
INVENTOR
WAYNE J. PETERS
BY    ATTORNEY United States Patent Office 3,446,526
Patented May 27, 1969

3,446,526
COLLAPSIBLE COVER FOR LUGGAGE COMPARTMENTS IN COMPACT VEHICLES
Wayne J. Peters, 1504 Knobhill, Milford, Mich. 48042
Filed Nov. 7, 1966, Ser. No. 592,441
Int. Cl. B60r 5/04, 7/00
U.S. Cl. 296—37       2 Claims This invention relates to vehicle luggage compartments generally, and more particularly to a collapsible hinged cover for use in covering luggage compartments behind the rear seats of compact automobiles.

Small compact vehicles, such as the Volkswagen, generally provide no shelf forward of the rear window on which to place cameras, tissue boxes, hand-bags and other small items. This space back of the rear seat is usually reserved exclusively as an open luggage compartment or storage well. However, this open area imparts an unfinished appearance to the interior of the vehicle, and detracts from its general styling.

Further cognizant of this shortcoming, the applicant has as the primary object of his invention, the provision of a cover for the luggage compartment in compact vehicles which may be collapsed and pivoted rearwardly against the back or fire wall so as not to materially reduce the storage space.

Another object of the invention is to provide an item of the type previously described, which will serve the combined purpose of a shelf and a supporting structure in which a radio speaker may be mounted.

A further object of the invention is to provide an item of the type previously described, which will effectively muffle motor noise and make the interior of the vehicle more quiet.

Other features and advantages of the invention will become apparent after thorough consideration of the following detailed description of the same, which was composed with reference to the drawings comprising a part of this application, and in which:

FIGURE 1 is a side elevation fragmentary view of a motor vehicle disclosing the applicant's invention mounted thereon, and showing the same in both an extended and a collapsed or retracted position.

FIGURE 2 is an enlarged front elevation view of the cover detached from the vehicle, and showing the end flaps in an extended position.

FIGURE 3 is an enlarged back perspective view of the cover in FIGURE 2, showing the hinged connection on the end flaps, and their collapsed position against the flat panel.

FIGURE 4 is an enlarged cross section view, taken substantially on plane 4—4 in FIGURE 2, showing structural details of the collapsible cover.

For a more detailed description of the invention, reference is made to the drawings in which numeral 10 designates generally a compact motor vehicle having a forwardly tiltable rear seat 12 with a trim bead 14 therearound providing a lateral seat 16 along the upper edge. An open luggage compartment or storage well 18 is provided between the rear seat 12 and the back or fire wall 20 of the vehicle 10.

The applicant's collapsible cover 22 for the luggage compartment 18 comprises a flat central panel 24, of plywood or other rigid material, having a rear side 26 and a shorter forward side 28. The ends 30 of the central flat panel 24 accordingly taper inwardly from the rear edge for reasons which will be later explained. A triangular end flap 32 is connected to each end of the central flat panel 24 by spaced hinges 34.

A conventional radio speaker 36 is mounted in the flat central panel 24 for connection into the sound system of the vehicle in the customary manner. The cover 22 is pivotally connected to the back or fire wall 20 of the vehicle 10 by a pair of strap hinges 38 on the flat central panel 24. The flat central panel 24 and the triangular end flaps 32 are covered with padding 40, and upholstered with material 42 to match the interior of the vehicle 10.

This completes a description of the structural details of the invention herein disclosed; however, to more fully comprehend and appreciate the subject matter presented, a discussion is hereinafter directed to the manner in which the collapsible cover is used to accomplish its intended function, and achieve the objective set forth in the introductory portion of this specification.

In use, the applicant's collapsible cover 22, when connected to the vehicle 10 in the manner previously described, may be pivoted to a horizontal or full line position shown in FIGURE 1, where it is supported along the forward edge 26 by the lateral seat 16. In this position, the cover 22 serves both as a closure for the luggage compartment 18, and a flat storage shelf. When it is desired to provide sufficient space in the luggage compartment 18 to receive larger items, the rear seat 12 is tilted forward to the broken line position shown in FIGURE 1.

The triangular end flaps 32 are then folded inwardly to the phantom line position 44 shown in FIGURE 3, so as to rest against the underside of the flat central panel 24. The cover 24 may then be pivoted downwardly between the inwardly disposed wheel wells 48 to the retracted or broken line position 46 shown in FIGURE 1. When it is again desired to cover the luggage compartment 18 of the vehicle 10, the steps above described, are followed in reverse sequence.

Based upon the foregoing discussion, the applicant is of the opinion that his invention has fulfilled a long-felt need in the field of luggage compartment covers for compact vehicles, and that he has accordingly made a valuable contribution to the related art. However, while the invention was described with reference to the structural details of a single embodiment, it will be appreciated by those familiar with the art, that the principles involved are susceptible of numerous other practical adaptations.

Therefore, I claim as new and desire to secure by Letters Patent:

1. In a vehicle having inwardly disposed wheel wells, a back wall, a tiltable rear seat, and an open luggage compartment between the seat and the back wall; a collapsible cover for such open luggage compartment comprising a flat panel, means pivotally connecting the flat panel to the back wall of the vehicle, a flap pivotally attached to each end of the flat panel swingable inwardly thereby permitting the cover to be pivoted between the inwardly disposed wheel wells from a fully retracted position against the back wall of the vehicle to an extended position where it is laterally supported on the rear seat so as to enclose the luggage compartment.

2. The collapsible cover of claim 1 in which the flaps are triangular in shape.

References Cited
UNITED STATES PATENTS
3,181,911   5/1965   Peras _____ 296—37
3,326,596   6/1967   Spina _____ 296—37

PHILIP GOODMAN, Primary Examiner.

U.S. Cl. X.R.
296—63